US012755403B2

(12) United States Patent
Guan

(10) Patent No.: US 12,755,403 B2
(45) Date of Patent: Oct. 6, 2026

(54) IMAGE DISPLAY METHOD, ELECTRONIC DEVICE, AND NON-TRANSISTORY STORAGE MEDIUM BASED ON CURRENT MOVEMENT INCREMENT

(71) Applicant: Beijing Zitiao Network Technology Co., Ltd., Beijing (CN)

(72) Inventor: Zhenghao Guan, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 134 days.

(21) Appl. No.: 18/836,139

(22) PCT Filed: Feb. 6, 2023

(86) PCT No.: PCT/CN2023/074499
§ 371 (c)(1),
(2) Date: Aug. 6, 2024

(87) PCT Pub. No.: WO2023/151524
PCT Pub. Date: Aug. 17, 2023

(65) Prior Publication Data
US 2025/0166213 A1 May 22, 2025

(30) Foreign Application Priority Data
Feb. 11, 2022 (CN) ......................... 202210130360.8

(51) Int. Cl.
*G06T 7/246* (2017.01)
*G06T 7/73* (2017.01)
*G06T 19/00* (2011.01)

(52) U.S. Cl.
CPC ................ *G06T 7/248* (2017.01); *G06T 7/74* (2017.01); *G06T 19/00* (2013.01); *G06T 2207/10016* (2013.01); *G06T 2207/30244* (2013.01)

(58) Field of Classification Search
None
See application file for complete search history.

(56) References Cited

U.S. PATENT DOCUMENTS 10,297,026 B1 5/2019 Jordan et al.
2007/0067570 A1* 3/2007 Su ...................... H04N 21/4331 348/E5.002
(Continued)

FOREIGN PATENT DOCUMENTS

CN 109448117 A 3/2019
CN 109920035 A 6/2019
(Continued)

OTHER PUBLICATIONS

European Patent Office, Extended European Search Report Issued in Application No. 23752304.8, Jan. 19, 2026, 1 9 pages.
(Continued)

*Primary Examiner* — Zhengxi Liu
(74) *Attorney, Agent, or Firm* — Alleman Hall LLP

(57) ABSTRACT

Embodiments of the present disclosure provide an image display method and apparatus, an electronic device, and a storage medium. The method includes: determining a current movement increment of a target reference point relative to a current to-be-processed video frame, the current movement increment being determined based on position information of the target reference point in a previous to-be-processed video frame; determining a current cumulative increment of the target reference point based on the current movement increment and a to-be-called cumulative increment, the to-be-called cumulative increment being determined based on historical movement increments of historical to-be-processed video frames and corresponding historical target movement amounts; determining a target movement amount of the target reference point according to the current cumulative increment and a preset displacement
(Continued)

function; and rendering a target object to a target display position in the current to-be-processed video frame based on the target movement amount.

18 Claims, 3 Drawing Sheets

(56) References Cited

U.S. PATENT DOCUMENTS

| | | | | |
|---|---|---|---|---|
| 2011/0075736 | A1* | 3/2011 | Endo | H04N 5/144 375/E7.125 |
| 2016/0344930 | A1 | 11/2016 | Chaaraoui et al. | |
| 2020/0380769 | A1 | 12/2020 | Liu et al. | |
| 2022/0038654 | A1* | 2/2022 | Reda | G06T 3/4007 |

FOREIGN PATENT DOCUMENTS

| | | | | |
|---|---|---|---|---|
| CN | 111464749 | A * | 7/2020 | H04N 23/80 |
| CN | 112132940 | A | 12/2020 | |
| CN | 113096225 | A | 7/2021 | |
| CN | 113487474 | A | 10/2021 | |
| CN | 113691733 | A | 11/2021 | |
| CN | 113810587 | A | 12/2021 | |
| CN | 113989173 | A | 1/2022 | |
| CN | 114494328 | A | 5/2022 | |
| CN | 114494328 | B | 1/2024 | |
| WO | 2021027631 | A1 | 2/2021 | |

OTHER PUBLICATIONS

Guo, Z. et al., “Implementation of an augmented reality system based on stereo vision,” Electronic Design Engineering, vol. 26, No. 23, Dec. 5, 2018, 6 pages. (Submitted with English abstract).

Ding, J. et al.,, “Dynamic Multi-objective Optimization Algorithm Based on Reference Point Prediction,” Journal of Automation, vol. 43, No. 2, Feb. 15, 2017, 18 pages. (Submitted with English abstract).

Yang, M., “A Moving Objects Detection Algorithm in Video Sequence,” Proceedings of “2014 International Conference on Audio, Language and Image Processing”, Jul. 9, 2014, Shanghai, China , 4 pages.

China National Intellectual Property Administration, Notice of Allowance issued in Chinese Application No. 202210130360.8, Jan. 4, 2024, 6 pages. (Submitted with partial English translation).

China National Intellectual Property Administration, Office action issued in Chinese Application No. 202210130360.8, Oct. 13, 2023, 10 pages. (Submitted with partial English translation).

ISA China National Intellectual Property Administration, International Search Report Issued in Application No. PCT/CN2023/074499, May 4, 2023, 10 pages. (Submitted with partial English translation).

* cited by examiner

IMAGE DISPLAY METHOD, ELECTRONIC DEVICE, AND NON-TRANSISTORY STORAGE MEDIUM BASED ON CURRENT MOVEMENT INCREMENT

CROSS-REFERENCE TO RELATED APPLICATIONS

The present application is a national stage of the International application PCT/CN2023/074499, filed on Feb. 6, 2023. This International application claims priority to Chinese Patent Application No. 202210130360.8 filed in China National Intellectual Property Administration on Feb. 11, 2022. All of these applications are hereby incorporated by reference in their entireties.

TECHNICAL FIELD

Embodiments of the present disclosure relate to the field of motion simulation technology, for example, to an image display method and apparatus, an electronic device, and a storage medium.

BACKGROUND

With the continuous development of computer technology, dynamic effects provided by an application to users are becoming more and more abundant, and the interest of generated videos is also constantly increasing. For example, a user may add an effect to a video according to his/her preferences during a process of capturing a video.

However, in the scheme provided by the related technology, when a user moves a terminal device, a picture in a video changes, and in this case, elements in a display interface cannot respond to the change, that is, an object in the display interface may not match a presentation effect in an actual scene during the movement of the terminal device, and therefore, there is a problem that the picture presented in the display interface is poor in texture, thereby affecting the user's usage experience.

SUMMARY

The present disclosure provides an image display method and apparatus, an electronic device, and a storage medium, to achieve a motion simulation of an object within an image of a video when the image of the video changes, to reduce a sense of separation between the object within the image and a real world, and to enhance the user's use experience.

In a first aspect, an embodiment of the present disclosure provides an image display method, comprising:

determining a current movement increment of a target reference point relative to a current to-be-processed video frame, the current movement increment being determined based on position information of the target reference point in a previous to-be-processed video frame;

determining a current cumulative increment of the target reference point based on the current movement increment and a to-be-called cumulative increment, the to-be-called cumulative increment being determined based on historical movement increments of historical to-be-processed video frames and corresponding historical target movement amounts;

determining a target movement amount of the target reference point according to the current cumulative increment and a preset displacement function; and rendering a target object to a target display position in the current to-be-processed video frame based on the target movement amount.

In a second aspect, an embodiment of the present disclosure further provides an image display apparatus, comprising:

a current movement increment determination module, configured to determine a current movement increment of a target reference point relative to a current to-be-processed video frame, the current movement increment being determined based on position information of the target reference point in a previous to-be-processed video frame;

a current cumulative increment determination module, configured to determine a current cumulative increment of the target reference point based on the current movement increment and a to-be-called cumulative increment, the to-be-called cumulative increment being determined based on historical movement increments of historical to-be-processed video frames and corresponding historical target movement amounts;

a target movement amount determination module, configured to determine a target movement amount of the target reference point according to the current cumulative increment and a preset displacement function; and a rendering module, configured to render a target object to a target display position in the current to-be-processed video frame based on the target movement amount.

In a third aspect, an embodiment of the present disclosure further provides an electronic device, and the electronic device comprises:

one or more processors;

a storage apparatus, configured to store one or more program, the one or more programs, when executed by the one or more processors, cause the one or more processors to implement the image display method according to any one of the embodiments of the present disclosure.

In a fourth aspect, an embodiment of the present disclosure further provides a storage medium, comprising computer-executable instructions, the computer-executable instructions, when executed by a computer processor, are used for performing the image display method according to any one of the embodiments of the present disclosure.

BRIEF DESCRIPTION OF DRAWINGS

Throughout the accompanying drawings, the same or similar reference numerals indicate the same or similar elements. It should be understood that the accompanying drawings are schematic and that components and elements are not necessarily drawn to scale.

DETAILED DESCRIPTION

It should be understood that the plurality of steps recorded in the implementation modes of the methods of the present disclosure can be performed according to different orders and/or performed in parallel. In addition, the implementation modes of the methods can include additional steps and/or omit performing the steps shown. The scope of the present disclosure is not limited in this aspect.

The term "comprise/include" and variations thereof used in this article are open-ended inclusion, namely "comprising/including but not limited to". The term "based on" refers to "at least partially based on". The term "one embodiment" means "at least one embodiment"; the term "another embodiment" means "at least one other embodiment"; and the term "some embodiments" means "at least some embodiments". Relevant definitions of other terms may be given in the description hereinafter.

It should be noted that the concepts, such as "first" and "second", mentioned in the present disclosure are only used to distinguish different apparatuses, modules, or units, and are not intended to limit orders or interdependence relationships of functions performed by these apparatuses, modules, or units. It should be noted that the modifications of "one" and "more/plurality" mentioned in the present disclosure are illustrative rather than restrictive, and those skilled in the art should understand that unless otherwise explicitly stated in the context, it should be understood as "at least one".

The names of messages or information interacted between a plurality of apparatuses in the implementations of the present disclosure are used for illustrative purposes only and are not used to limit the scope of such messages or information.

Before introducing the present technical scheme, an application scenario of the embodiments of the present disclosure may be exemplified first. Exemplarily, when the user captures a video through an application software or makes a video call with another user, some effects (e.g., a three-dimensional (3D) object model in a floating state) may be added to the captured video. When the user moves the terminal device and causes the camera angle of view to change, the captured video picture is also changed. In this case, if the object in the video picture remains still, the user may have a feeling of separation between the object and the real world. According to the technical solution of the present embodiment, the application can simulate the movement of the object within the image during the process of the video image changing, thereby causing the object to present a more realistic dynamic effect and improving the quality of the video image.

Figure 1:
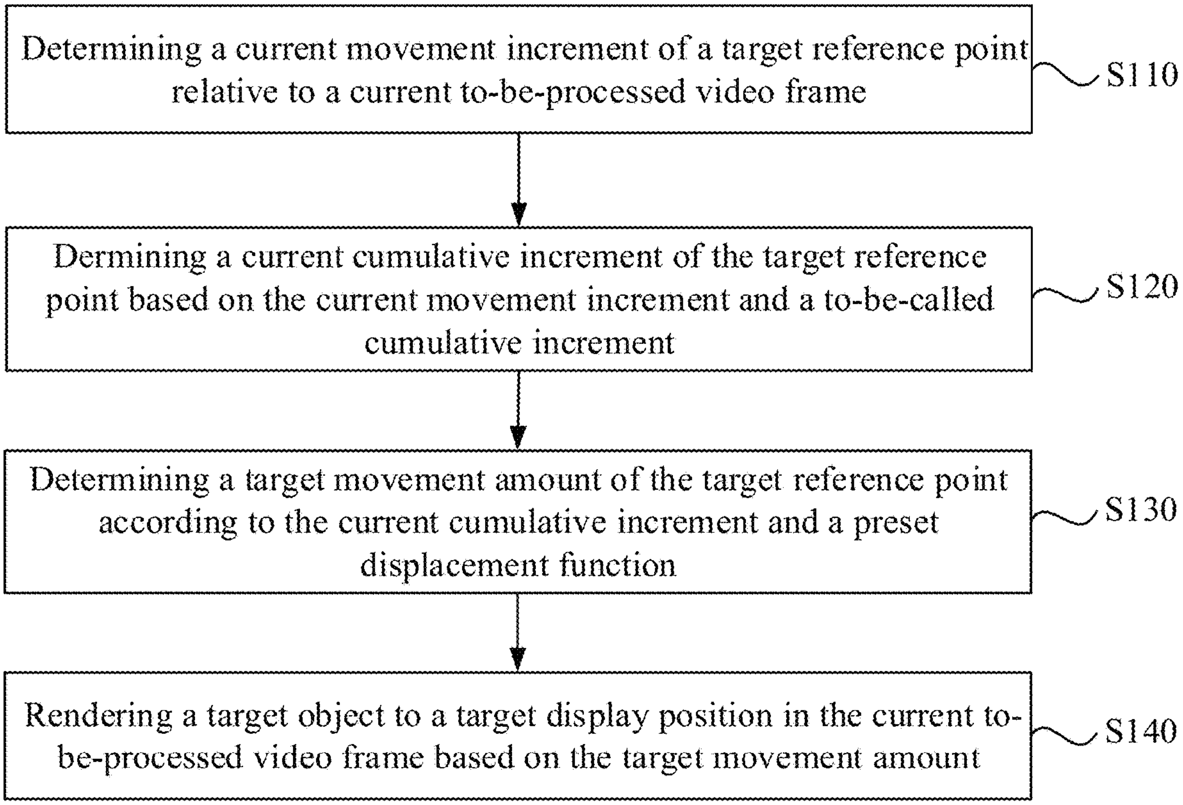
FIG. 1 is a schematic flowchart of an image display method according to an embodiment of the present disclosure.

FIG. 1 is a schematic flowchart of an image display method according to an embodiment of the present disclosure, the embodiments of the present disclosure are applicable to a situation in which a motion simulation is performed on an object in a display interface in a process in which the terminal device is being moved, so as to make a content of the display interface consistent with an actual scene, the method may be performed by an image display apparatus, the apparatus may be implemented in the form of software and/or hardware, for example, by an electronic device, and the electronic device may be a mobile terminal, a PC terminal, a server, or the like.

As shown in FIG. 1, the method comprises:

S110, determining a current movement increment of a target reference point relative to a current to-be-processed video frame.

Here, the apparatus for executing the image display method provided by the embodiment of the present disclosure can be integrated in the application software supporting an effect video processing function, and the application software can be installed in an electronic device, for example, the electronic device can be a mobile terminal or a PC terminal, etc. The application software can be a kind of software for image/video processing, and the specific application software will not be described in detail here, as long as it can realize image/video processing. The application software can also be a specially developed application program, which is integrated in the software that adds the effects and displays the effects, or is integrated in the corresponding page, and the user can achieve to process the effect video through the integrated page in the PC terminal.

It should be noted that the technical solution of the present embodiment can be executed during the process of a user shooting a video, that is, when the user is shooting a video or making a video call with another user, an augmented reality (AR) effect can be added to a captured picture by applying a function provided by the application, and when the user controls a camera device to move, the special effect in the picture can be simulated to have an effect of inertial motion based on the technical solution of this embodiment.

In the embodiment, when the user causes the application to add a target effect (e.g., a 3D object in a floating state) in the video picture by touching a pre-developed effect add control, the application associates the added target effect with a pre-created mount point. The target effect may be any floatable model, for example, be a pre-created 2D or 3D model. This model can be used as the target object in the display interface. When the target object is displayed in the display interface in a floating state, a traction effect may also be simulated for the object to reflect the effect of the user adjusting the target effect. For example, the target object may be a balloon which is in a shape of love heart and is pre-set with certain material properties, and at the same time, when the balloon is displayed on the display interface, the balloon is also associated with a cartoon arm through a connection line, thereby creating the traction effect.

It can be understood that the mount point of the effect is the target reference point. The target reference point is pre-constructed based on a virtual rendering camera, which can be understood as pre-creating the target reference point at a certain position corresponding to the rendering camera and taking the target reference point as a "sub-object" of the rendering camera, and at the same time, keeping the positional relationship between the target reference point and the rendering camera relatively stationary at all times. On this basis, when the user moves the terminal device, a position of the virtual rendering camera in a three-dimensional space coordinate system changes, and accordingly, a coordinate of the target reference point in the three-dimensional space coordinate system also changes in order to keep the relative positional relationship between the target reference point and the rendering camera constant.

Illustratively, when the user moves the terminal device resulting in a change in the captured video picture, not only the coordinate of the virtual rendering camera in the three-dimensional space is changed, but also the coordinate of the target reference point is changed. Based on this, it can be understood that the floating 3D balloon associated with the target reference point in the video picture moves with the movement of the target reference point.

It should be noted that when the user moves the terminal device causing the video picture to change, the three-dimensional coordinates of the target reference point may vary in each video frame. Taking two adjacent video frames in a video as an example for description, if a video frame at a current time is used as a to-be-processed video frame, a distance between a position of the target reference point in the picture of this frame and a position of the target reference point in the picture of a previous frame is the current movement increment of the target reference point. It can be understood that the current movement increment is a three-dimensional vector, and the current movement increment is determined based on the position information of the target reference point in the previous to-be-processed video frame. For example, the target reference point associated with the 3D balloon in the above example is moved from a point A to a point B in the three-dimensional space in the displayed pictures of two adjacent video frames, and a vector (Δx, Δy, Δz) calculated based on the three-dimensional coordinates of the two points is the current movement increment of the target reference point, and the current movement increment can characterize at least the distance and direction when the target reference point moving from the point A to the point B.

In the present embodiment, in order to accurately get the current movement increment of the target reference point, first it is necessary to determine a relative position matrix of the target reference point and the rendering camera, so that according to the relative position matrix, the current movement increment of the target reference point with respect to the current to-be-processed video frame is determined.

It can be understood that the relative position moment between the target reference point and the rendering camera remains unchanged at all times, so that in the case that the coordinate of the rendering camera in the three-dimensional space has been determined, the coordinate of the target reference point in the three-dimensional space can be calculated according to the relative position matrix. The coordinate of the rendering camera within the three-dimensional space may be represented by the camera position information, and the process of determining the camera position information is described below.

For example, the camera position information of the rendering camera is determined based on a simultaneous localization and mapping algorithm; current position information of the target reference point is determined according to the relative position matrix and the camera position information; and the current movement increment is determined according to the current position information and historical position information to which a previous to-be-processed video frame corresponds.

Among them, the basic principle of the simultaneous localization and mapping (SLAM) algorithm in the field of AR technology is to achieve localization and reduction of localization error through multi-feature matching using the method of probability statistics, and mainly includes several parts such as feature extraction, data association, state estimation, state update, and feature update. It can thus be appreciated that the SLAM-based algorithm can construct a map with a more realistic visual effect, thereby rendering a superposition effect of the virtual object for the current perspective, so that the virtual object in the picture is more realistic without any sense of dissonance. Specifically, in the embodiment, the application may determine the coordinate of the rendering camera within the three-dimensional space coordinate system based on the SLAM algorithm regardless of the shooting angle of the camera device.

For example, after the camera position information of the rendering camera is determined, the current position information of the target reference point can be calculated based on the coordinate and the relative position matrix, that is, the coordinate values of the target reference point in the to-be-processed video frame at the current time in the three-dimensional space coordinate system are calculated.

In this embodiment, after the current position information of the target reference point is determined, the difference between the current coordinate of the target reference point and the corresponding coordinate value of the target reference point in the previous to-be-processed video frame is calculated, and this difference is used as the current movement increment of the target reference point. It is understood that the coordinate value corresponding to the target reference point in the previous to-be-processed video frame is historical position information of the target reference point.

Continuing to explain with the above example, when the user moves the terminal device to cause a change in the video picture, the camera position information, i.e., the coordinate value within the three-dimensional space coordinate system, of the rendering camera also changes. For example, when a to-be-processed video frame at the current moment is present in the video picture, the application may determine the camera position information of the rendering camera, i.e., the coordinate value of the rendering camera in the three-dimensional space coordinate system, at this moment based on the SLAM algorithm, and may calculate to obtain the coordinate ($x_2$, $y_2$, $z_2$) of the target reference point in the three-dimensional space coordinate system after the movement of the target reference point according to the determined coordinate value and the relative position matrix. For example, by obtaining the coordinate value ($x_1$, $y_1$, $z_1$) corresponding to the target reference point in the previous to-be-processed video frame and taking the difference between the above two coordinate values, the current movement increment (Δx, Δy, Δz) of the target reference point with respect to the current to-be-processed video frame during the process of changing the video shooting angle by the user can be obtained.

In the present embodiment, because the camera position information of the rendering camera, and the target current position information of the target reference point are both coordinate values within the three-dimensional space coordinate system, in the actual application process, the movement sub-increments in the coordinate axis directions can be determined according to the current space coordinate corresponding to the current position information and the historical space coordinate corresponding to the historical position information; and the movement sub-increments are taken as the current movement increment.

Exemplarily, in the to-be-processed video frame at the current moment, the current space coordinate of the target reference point associated with the 3D balloon is ($x_2$, $y_2$, $z_2$), and in the adjacent to-be-processed video frame before the current moment, the historical space coordinate of the target reference point is ($x_1$, y1, $z_1$), based on this, the variations of the coordinate value of the target reference point in the directions of the three coordinate axes of the space coordinate system can be determined, for example, the variation of the target reference point in the x-axis is $\Delta x = x_2 - x_1$, the variation in the y-axis is $\Delta y = y_2 - y_1$, and the variation in the z-axis is $\Delta z = x_2 - z_1$. It can be understood that the above three coordinate value variations are movement sub-increments of the target reference point in the plurality of coordinate axis directions, and each of the movement sub-increments can be taken as the current movement increment of the target reference point in the three-dimensional space coordinate system, and of course, the vector sum determined based on the above three movement sub-increments can also be taken as the current movement increment, and the embodiments of the present disclosure do not describe details herein again.

S120, determining a current cumulative increment of the target reference point based on the current movement increment and a to-be-called cumulative increment.

For the to-be-processed video frame at the current moment, there may be a plurality of to-be-processed video frames before this frame, it can be understood that when the user moves the terminal device to cause a change in the video picture, there is also a difference in the position of the target reference point in different to-be-processed video frames, so that in the embodiment, when the current movement increment of the target reference point relative to the current to-be-processed video frame is determined, in order for the target reference point to accurately simulate the effect of inertial motion, there is also a need to consider the to-be-called cumulative increment in a plurality of to-be-processed video frames before the current moment, and then a sum of the current movement increment of the target reference point and the to-be-called cumulative increment is calculated, and the calculation result is taken as the current cumulative increment of the target reference point.

The to-be-called cumulative increment is determined based on historical movement increments of historical to-be-processed video frames and corresponding historical target movement amounts, the historical to-be-processed video frames may be a plurality of video frames prior to the current moment during the process in which the user moves the terminal device resulting in a change in the video picture, it can be understood that the to-be-called cumulative increment is updated every time a picture of one to-be-processed video frame is displayed in the display interface in the process in which the target reference point moves in the three-dimensional space.

Exemplarily, during the process of changing the shooting angle, the camera device collects three to-be-processed video frames $N_1$, $N_2$, and $N_3$ in total, and the to-be-processed video frame at the current moment is the video frame $N_3$, and the two video frames $N_1$, $N_2$ before the current moment are historical to-be-processed video frames; meanwhile, the movement increments of the target reference point corresponding to the video frames $N_1$, $N_2$, and $N_3$ are (0, 0, 0), ($\Delta x_1$, $\Delta y_1$, $\Delta z_1$), and ($\Delta x_2$, $\Delta y_2$, $\Delta z_2$), respectively, correspondingly, the movement amount of the target reference point in the display interface corresponding to the video frame Ni is (0, 0, 0) and the movement amount of the target reference point in the display interface corresponding to the video frame $N_2$ is ($a_1$, $b_1$, $c_1$), on this basis, when the picture of the video frame $N_2$ is displayed in the display interface, the corresponding to-be-called cumulative increment ($\Delta x_1-a_1$, $\Delta y_1-b_1$, $\Delta z_1-c_1$) when the target reference point moves to the position in the picture of the video frame $N_2$ is determined. For example, the current cumulative increment is the sum, i.e., ($\Delta x_1-a_1+\Delta x_2$, $\Delta y_1-b_1+\Delta y_2$, $\Delta z_1-c_1+\Delta z_2$), of the to-be-called cumulative increment and the current movement increment corresponding to the to-be-processed video frame (i.e., video frame $N_3$) at the current moment.

In the actual application process, because the target reference point moves a plurality of times, the to-be-called cumulative increment need to be constantly updated, and therefore, an increment cache pool for storing the to-be-called cumulative increment may be constructed in advance within a storage space of the device, and at the same time, because the to-be-called cumulative sub-increments in a plurality of coordinate axis directions are included in the to-be-called cumulative increment, the to-be-called cumulative increment determined each time may be decoupled based on different coordinate axes and stored. For example, when the current movement increment of the target reference point is determined, the to-be-called cumulative increment may be directly retrieved from the increment cache pool; a plurality of cumulative movement sub-increments of the target reference point in a plurality of coordinate axis directions are determined based on the to-be-called cumulative sub-increments and corresponding movement sub-increments; and the plurality of cumulative movement sub-increments are as the current cumulative increment.

Continuing with the above example for description, when the increment cache pool is constructed in advance, it is determined that the target reference point moves to a position in a second to-be-processed video frame, and the corresponding to-be-called cumulative increment is ($\Delta x_1-a_1$, $\Delta y_1-b_1$, $\Delta z_1-c_1$), the to-be-called cumulative increment is decoupled based on the x-axis, the y-axis, and the z-axis in the three-dimensional space coordinate system, thereby obtaining the to-be-called cumulative sub-increment $\Delta x_1-a_1$ in the x-axis direction, the to-be-called cumulative sub-increment $\Delta y_1-b_1$ in the y-axis direction, and the to-be-called cumulative sub-increment $\Delta z_1-c_1$ in the z-axis direction, and furthermore, the above three to-be-called cumulative sub-increments are stored to the increment cache pool. When the current movement increment ($\Delta x_2$, $\Delta y_2$, $\Delta z_2$) of the target reference point in the to-be-processed video frame at the current moment is determined, the coordinate values respectively in the three directions of the x-axis, the y-axis, and the z-axis are respectively added to the corresponding three to-be-called cumulative increments in the incremental cache pool to obtain three cumulative movement sub-increments $\Delta x_1-a_1+\Delta x_2$, $\Delta y_1-b_1+\Delta y_2$, $\Delta z_1-c_1+\Delta z_2$, it can be understood that the above three cumulative movement sub-increments can be taken as the current cumulative increment of the target reference point at the current moment.

S130, determining a target movement amount of the target reference point according to the current cumulative increment and a preset displacement function.

In the embodiment, when the current cumulative increment of the target reference point at the current moment is determined, the current cumulative increment can be inputted into the preset displacement function integrated into the application, thereby calculating the target movement amount of the target reference point. The target movement amount reflects the direction and distance in which the target reference point needs to move in the display interface corresponding to the application.

For example, the preset displacement function is determined based on a traction coefficient for towing the target object, a preset wind resistance coefficient, and a speed coefficient, the traction coefficient is a parameter determined in order to cause the object to present an effect of being pulled by the traction effect during the movement, the preset wind resistance coefficient is a parameter determined in order to cause the object to exhibit an effect of being resisted by the wind during the movement, and the speed coefficient is a parameter determined in order to make the object present the effect of moving based on an initial speed during the movement. In practice, the preset displacement function may be $y=(math.abs(x)x)*(k_1+k_3*x*x)+k_2*x$, where y is the finally obtained target movement amount of the target reference point in the display interface, $k_1$ is the traction coefficient, $k_2$ is the preset wind resistance coefficient, $k_3$ is the speed coefficient, and x is the current cumulative increment of the target reference point. For example, when it is determined that the current cumulative increment of the target reference point associated with the 3D balloon is ($\Delta x_1-a_1+\Delta x_2$, $\Delta y_1-b_1+\Delta y_2$, $\Delta z_1-c_1+\Delta z_2$), the coordinate value may be input as x into the preset displacement function, thereby obtaining the target movement amount of the reference point in the display interface.

It should be understood by those skilled in the art that, in the actual application, the three coefficients $k_1$, $k_2$, and $k_3$ may be set empirically, and a mapping table characterizing the correspondence between different objects and the corresponding three coefficients may also be established in advance, based on this, the three coefficients may be determined through looking up the table when the target movement amount of a certain object needs to be determined, and the embodiments of the present disclosure do not describe the details herein.

It should be noted that, in the process of determining the target movement amount of the target reference point, in order to prevent a situation in which only a slight change in the shooting angle causes the object in the display interface to generate an inertial motion that does not conform to the actual, it is also possible to set a threshold for the current cumulative increment in advance, such as taking 0.1 as the movement amount threshold for the cumulative movement sub-increment. For example, processing a cumulative movement sub-increment greater than a preset movement amount threshold based on the preset displacement function to obtain a first to-be-moved amount; taking a cumulative sub-increment not greater than the preset movement amount threshold as a second to-be-moved amount; and determining the target movement amount based on the first to-be-moved amount and the second to-be-moved amount.

The first to-be-moved amount/the second to-be-moved amount refer to a theoretical movement amount in the display interface determined by the application for the target reference point, not a target movement amount that determines how the application ultimately renders the target object on the display interface. It can be understood that when the preset movement amount threshold is compared with the size of the cumulative movement sub-increment, when the comparison result is different, the determined target movement value is also different.

Exemplarily, when the cumulative movement sub-increment of the target reference point in the x-axis direction is 0.05 and the preset movement amount threshold is 0.1, because the cumulative movement sub-increment is smaller than the preset movement amount threshold, although the cumulative movement sub-increment is inputted into the preset displacement function to obtain the corresponding target movement amount, the target movement amount needs to be erased because it is too small, thereby avoiding a situation in which the target object associated with the target reference point generates an unrealistic inertial motion, i.e., the target movement amount is finally determined to be 0, and the target object remains relatively stationary in the display interface. Accordingly, when the cumulative movement sub-increment of the target reference point in the x-axis direction is 0.2 and the preset movement amount threshold is 0.1, because the cumulative movement sub-increment is greater than the preset movement amount threshold, in this case, it is necessary to simulate the inertial motion of the target object associated with the target reference point in the display interface, i.e., the cumulative movement sub-increment 0.2 is input to the preset displacement function to obtain the corresponding target movement amount.

S140, rendering a target object to a target display position in the current to-be-processed video frame based on the target movement amount.

In this embodiment, after the target movement amount of the target reference point is determined, the target display position of the target reference point in the current to-be-processed video frame may be determined based on the target movement amount, thereby rendering the target object to the target display position.

For example, when the target movement amount is determined, the target movement amount may be sent down to a vertex shader used for rendering the image, thereby determining a final position, i.e., the target display position, in the display interface where the object associated with the target reference point needs to be displayed. The target display position may be a two-dimensional coordinate, the vertex shader is a programmable program that is used for image rendering and replaces a fixed rendering pipeline, is primarily responsible for the geometric computation of the vertices in the model. It should be understood by those skilled in the art that only one vertex shader can be activated at the same time, and when the vertex shader runs in the GPU, a corresponding image can be rendered in the display interface, and embodiments of the present disclosure do not repeat the relevant contents in detail herein.

In this embodiment, the primary task of the vertex shader is to convert the target movement amount of the target reference point from a three-dimensional model space to a homogeneous clipping space, i.e., to convert the three-dimensional coordinate into the two-dimensional coordinate corresponding to the display interface. It can be understood that the target object in the display interface is formed of two faces, coordinates of vertices of two triangles of one face of the target object are determined after processing the target movement amount by the vertex shader, and the coordinates are also the coordinates obtained by perspective division or homogeneous division on the basis of the homogeneous clipping space and can be used to reflect at least the display position of the target object associated with the target reference point in the display interface. That is, a process showing the inertial motion of the target object as the shooting angle changes can be rendered in the display interface based on the two-dimensional coordinates determined by the vertex shader.

It should be noted that the above-mentioned solution of the present embodiment describes the process of determining the rendering of the target object in the to-be-processed video frame at the current moment, however, the camera device may also continue to generate movement after the current moment, and accordingly, the target object needs to generate inertial motion in the picture of the to-be-processed video frame at the subsequent moment, and therefore, the rendering method of the target object in the subsequent frames can be performed according to the embodiment of the present disclosure.

For example, after determining the target movement amount of the target reference point in the to-be-processed video frame at the current moment, in order to ensure that the application can accurately render the picture of the inertial motion of the target object in the display interface after the moment, it is further necessary to update the to-be-called cumulative increment based on the target movement amount and store the to-be-called cumulative increment into the increment cache pool to determine the target movement amount of a next to-be-processed video frame.

Continuing to explain with the above example, when it is determined that the target movement amount of the target reference point in the to-be-processed video frame at the current moment is ($a_2$, $b_2$, $c_2$), the to-be-called cumulative increment ($\Delta x_1-a_1$, $\Delta y_1-b_1$, $\Delta z_1-c_1$) at the current moment needs to be updated based on the parameter, i.e., subtracting the movement increment and the target movement amount of the target reference point in the to-be-processed video frame at the current moment from the to-be-called cumulative increment, and taking the calculated ($\Delta x_1-a_1+\Delta x_2-a_2$, $\Delta y_1-b_1+\Delta y_2-b_2$, $\Delta z_1-c_1+\Delta z_2-c_2$) as the updated to-be-called cumulative increment, and decoupling it according to the three coordinate axes in the three-dimensional space coordinate system, storing the obtained three values into the increment cache pool, respectively, when it is necessary to determine the target movement amount of the target reference point in the next to-be-processed video frame, according to the scheme of the present embodiment, the to-be-called cumulative increment is called from the increment cache pool to calculate a new target movement amount ($a_3$, $b_3$, $c_3$) of the target reference point.

It should be noted that the technical solution of the present embodiment may be implemented in a mobile terminal in which a relevant video processing application is installed, may also be implemented by a cloud server through uploading relevant data to the cloud by the application, and when the server has finished processing, the processing result may be sent down to a corresponding terminal, thereby rendering an inertial motion picture of the target object in a display interface of the corresponding terminal.

For example, taking a case that a target effect mounted on the target reference point is a balloon as an example, assuming that a position of the target reference point in a N-th frame is A and a position of the target reference point in a (N+1)-th frame is B, i.e., the balloon effect is expected to move from point A to point B, but in practical application, the movement of the balloon is slow, the calculated display position of the balloon effect in the N-th frame is a point C between the point A and the point B, i.e., an actual movement distance of the balloon effect is less than a desired movement distance |AB|. In practice, there is inertia in the movement of any object, when a mobile terminal to which all video frames after a (N+2)-th frame belong does not move, the calculated balloon effect moves to a point D, a distance between A and D is larger than a distance between A and B, and the balloon effect can be returned from point D to point B in subsequent frames due to the action of the traction rope.

The technical solution of an embodiment of the present disclosure first determines a current movement increment of a target reference point relative to a current to-be-processed video frame, that is, determines a movement increment of the target reference point within a three-dimensional space coordinate system, then determines a target movement amount of the target reference point according to the current movement increment and a to-be-called cumulative increment, for example, determines the target movement amount of the target reference point according to the current cumulative increment and a preset displacement function and renders a target object to a target display position in the current to-be-processed video frame based on the target movement amount, thereby achieving the motion simulation of an object in a picture when the picture of the video changes, reducing the sense of severance between the object in the picture and the real world, and improving the quality of the picture, while also enhancing the user's usage experience.

Figure 2:
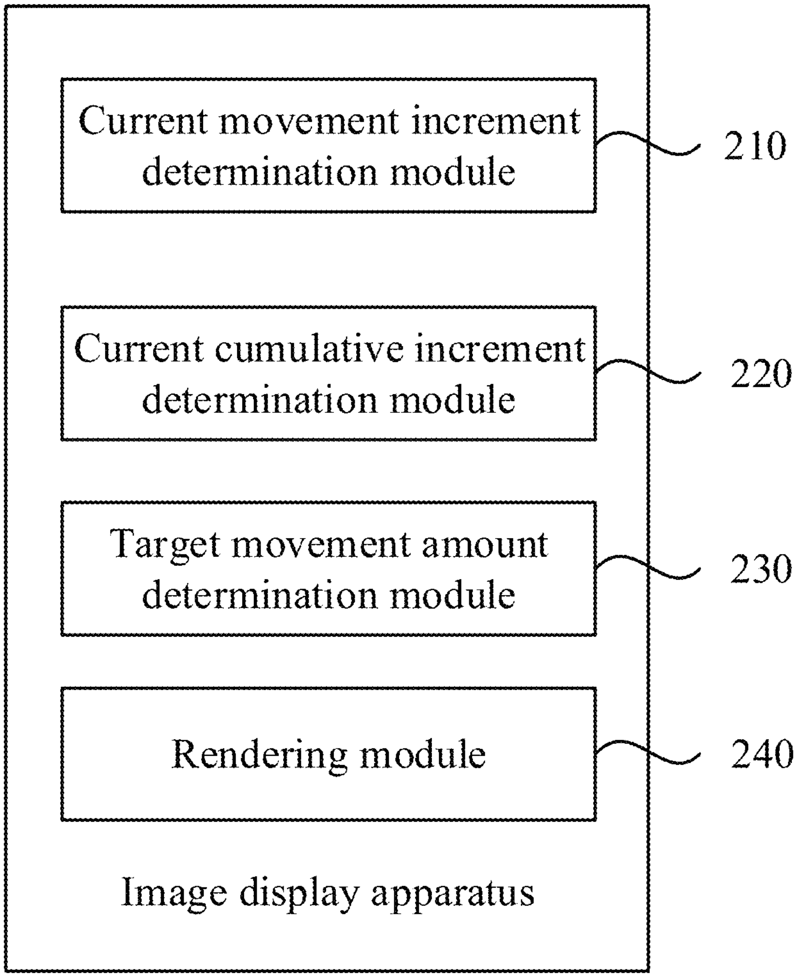
FIG. 2 is a schematic structural diagram of an image display apparatus according to an embodiment of the present disclosure.

FIG. 2 is a schematic structural diagram of an image display apparatus according to an embodiment of the present disclosure, as shown in FIG. 2, the apparatus includes a current movement increment determination module 210, a current cumulative increment determination module 220, a target movement amount determination module 230, and a rendering module 240.

The current movement increment determination module 210 is configured to determine a current movement increment of a target reference point relative to a current to-be-processed video frame, and the current movement increment is determined based on position information of the target reference point in a previous to-be-processed video frame.

The current cumulative increment determination module 220 is configured to determine a current cumulative increment of the target reference point based on the current movement increment and a to-be-called cumulative increment, and the to-be-called cumulative increment is determined based on historical movement increments of historical to-be-processed video frames and corresponding historical target movement amounts.

The target movement amount determination module 230 is configured to determine a target movement amount of the target reference point according to the current cumulative increment and a preset displacement function.

The rendering module 240 is configured to render a target object to a target display position in the current to-be-processed video frame based on the target movement amount.

On the basis of the above technical solution, the image display apparatus further comprises a to-be-called cumulative increment update module.

The to-be-called cumulative increment update module is configured to update the to-be-called cumulative increment based on the target movement amount and store the to-be-called cumulative increment into an increment cache pool to determine a target movement amount for a next to-be-processed video frame.

On the basis of the above technical solution, the image display apparatus further includes a relative position matrix determination module.

The relative position matrix determination module is configured to determine a relative position matrix of the target reference point and a rendering camera, to determine, according to the relative position matrix, the current movement increment of the target reference point relative to the current to-be-processed video frame; the target reference point is for mounting a target effect.

On the basis of the above technical solution, the current movement increment determination module 210 includes a camera position information determination unit, a current position information determination unit, and a current movement increment determination unit.

The camera position information determination unit is configured to determine camera position information of the rendering camera based on a simultaneous localization and mapping algorithm.

The current position information determination unit is configured to determine current position information of the target reference point according to the relative position matrix and the camera position information.

The current movement increment determination unit is configured to determine the current movement increment according to the current position information and historical position information corresponding to the previous to-be-processed video frame.

For example, the current movement increment determination unit is further configured to determine a movement sub-increment in a coordinate axis direction according to a current space coordinate corresponding to the current position information and a historical space coordinate corresponding to the historical position information; and take the movement sub-increment as the current movement increment.

On the basis of the above technical solution, the current cumulative increment determination module 220 includes a to-be-called cumulative increment invoking unit and a current cumulative increment determination unit.

The to-be-called cumulative increment invoking unit is configured to retrieve the to-be-called cumulative increment from the increment cache pool, the to-be-called cumulative increment comprising a to-be-called cumulative sub-increment in a coordinate axis direction; determine a cumulative movement sub-increment of the target reference point in a coordinate axis direction based on the to-be-called cumulative sub-increment and a corresponding movement sub-increment.

The current cumulative increment determination unit is configured to take the cumulative movement sub-increment as the current cumulative increment.

On the basis of the above technical solution, the target movement amount determination module 230 includes a to-be-moved amount determination unit and a target movement amount determination unit.

The to-be-moved amount determination unit is configured to process a cumulative movement sub-increment greater than a preset movement amount threshold based on the preset displacement function to obtain a first to-be-moved amount; and take a cumulative sub-increment not greater than the preset movement amount threshold as a second to-be-moved amount.

The target movement amount determination unit is configured to determine the target movement amount based on the first to-be-moved amount and the second to-be-moved amount.

On the basis of the above technical solution, the preset displacement function is determined based on a traction coefficient for towing the target object, a preset wind resistance coefficient, and a speed coefficient.

On the basis of the above technical solution, the rendering module 240 includes a target display position determination unit and a rendering unit.

The target display position determination unit is configured to determine, based on the target movement amount, the target display position of the target reference point in the current to-be-processed video frame.

The rendering unit is configured to render the target object to the target display position.

The technical solution provided by the embodiment first determines a current movement increment of a target reference point relative to a current to-be-processed video frame, that is, determines a movement increment of the target reference point within a three-dimensional space coordinate system, then determines a target movement amount of the target reference point according to the current movement increment and a to-be-called cumulative increment, for example, determines the target movement amount of the target reference point according to the current cumulative increment and a preset displacement function and renders a target object to a target display position in the current to-be-processed video frame based on the target movement amount, thereby achieving the motion simulation of an object in a picture when the picture of the video changes, reducing the sense of separation between the object in the picture and the real world, and improving the quality of the picture, while also enhancing the user's usage experience.

The image display apparatus provided by the embodiments of the present disclosure can execute the image display method provided by any of the embodiments of the present disclosure, and has corresponding functional modules for executing the method and beneficial effects.

It is worth noting that the various units and modules included in the above-described apparatus are only divided according to functional logics, but not limited to the division manner described above, as long as the corresponding functions can be implemented; in addition, the specific names of the plurality of functional units are only for the convenience of distinguishing between each other, and are not intended to limit the protection scope of the embodiments of the present disclosure.

Figure 3:
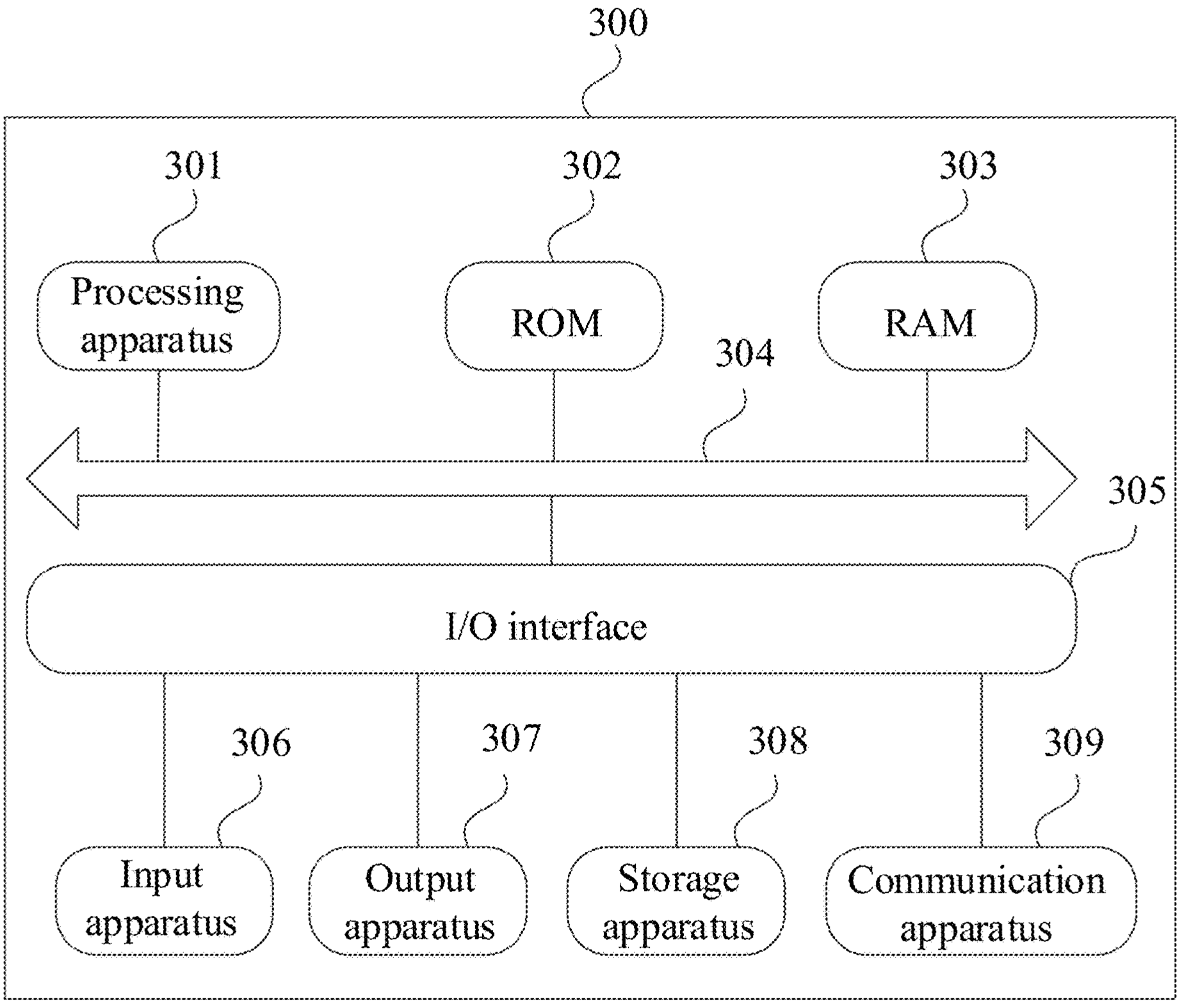
FIG. 3 is a schematic structural diagram of an electronic device according to an embodiment of the present disclosure.

FIG. 3 is a schematic structural diagram of an electronic device according to an embodiment of the present disclosure. Reference is made below to FIG. 3, which shows a structural schematic diagram of an electronic device (for example, a terminal device or a server in FIG. 3) 300 suitable for implementing an embodiment of the present disclosure. The electronic device in the embodiments of the present disclosure can include, but is not limited to, mobile terminals such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), or the like, and fixed terminals such as a digital television (TV), a desktop computer, or the like. The electronic device shown in FIG. 3 is only an example, and should not bring any limitation to the functions and application scope of the embodiments of the present disclosure.

As shown in FIG. 3, the electronic device 300 may include a processing apparatus (for example, a central processing unit, a graphics processing unit, etc.) 301, which may perform various appropriate actions and processes according to programs stored in a read-only memory (ROM) 302 or programs loaded from a storage apparatus 308 into a random access memory (RAM) 303. In the RAM 303, various programs and data required for operations of the electronic device 300 are also stored. The processing apparatus 301, the ROM 302, and the RAM 303 are connected to each other through a bus 304. An input/output (I/O) interface 305 is also connected to the bus 304.

Usually, the following apparatuses can be connected to the I/O interface 305: an input apparatus 306 including, for example, a touch screen, a touch pad, a keyboard, a mouse, a camera, a microphone, an accelerometer, a gyroscope, or the like; an output apparatus 307 including, for example, a liquid crystal display (LCD), a loudspeaker, a vibrator, or the like; a storage apparatus 308 including, for example, a magnetic tape, a hard disk, or the like; and a communication apparatus 309. The communication apparatus 309 may allow the electronic device 300 to be in wireless or wired communication with other devices to exchange data. While FIG. 3 illustrates the electronic device 300 having various apparatuses, it should be understood that not all of the illustrated apparatuses are required to be implemented or included. More or fewer apparatuses may be implemented or provided alternatively.

According to the embodiments of the present disclosure, processes described above with reference to the flowchart may be implemented as a computer software program. For example, an embodiment of the present disclosure includes a computer program product, which includes a computer program carried on a non-transitory computer-readable medium, and the computer program includes program codes for performing the method shown in the flowchart. In such an embodiment, the computer program may be downloaded and installed from a network through the communication apparatus 309, or installed from the storage apparatus 308, or installed from the ROM 302. When the computer program is executed by the processing apparatus 301, the above functions defined in the method of the embodiment of the present disclosure are performed.

The names of messages or information exchanged between a plurality of apparatuses in the implementations of the present disclosure are used for illustrative purposes only, and are not intended to limit the scope of the messages or information.

The electronic device provided by the embodiments of the present disclosure belongs to the same inventive concept as the image display method provided by the above embodiments, technical details that are not elaborately described in the present embodiment can be referred to the above embodiments, and the present embodiment has the same beneficial effects as the above embodiments.

An embodiment of the present disclosure provides a computer storage medium, a computer program is stored on the computer storage medium, when the computer program is executed by a processor, the image display method provided by the above embodiments is implemented.

It should be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semi-conductive system, apparatus, or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a portable compact disc read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus, or device. In the present disclosure, the computer-readable signal medium may include a data signal that propagates in a baseband or as a part of a carrier wave and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate, or transmit a program used by or in combination with an instruction execution system, apparatus, or device. The program code contained on the computer-readable medium may be transmitted by using any suitable medium, including but not limited to an electric wire, a fiber-optic cable, radio frequency (RF), and the like, or any appropriate combination of them.

In some implementations, a client and a server may communicate by using any currently known or future developed network protocol, such as HTTP (HyperText Transfer Protocol), and may be interconnected with digital data communication (for example, the communications network) in any form or medium. Examples of the communication network include a local area network ("LAN"), a wide area network ("WAN"), the Internet (for example, the Internet), and an end-to-end network (for example, an ad hoc end-to-end network), as well as any currently known or future developed network.

The above-mentioned computer-readable medium may be included in the electronic device described above, or may exist alone without being assembled into the electronic device.

The above-mentioned computer-readable medium carries one or more programs, when the one or more programs are executed by the electronic device, the electronic device is caused to:

determine a current movement increment of a target reference point relative to a current to-be-processed video frame, the current movement increment being determined based on position information of the target reference point in a previous to-be-processed video frame;

determine a current cumulative increment of the target reference point based on the current movement increment and a to-be-called cumulative increment, the to-be-called cumulative increment being determined based on historical movement increments of historical to-be-processed video frames and corresponding historical target movement amounts;

determine a target movement amount of the target reference point according to the current cumulative increment and a preset displacement function; and render a target object to a target display position in the current to-be-processed video frame based on the target movement amount.

The computer program codes for performing the operations of the present disclosure can be written in one or more programming languages or a combination thereof. The above programming languages include but not limited to object-oriented programming languages such as Java, Smalltalk, C++, and also include conventional procedural programming languages such as the "C" language or similar programming languages. The program code can be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the accompanying drawings illustrate system architectures, functions, and operations that may be implemented by the system, the method, and the computer program product according to the various embodiments of the present disclosure. In this regard, each block in the flowcharts or block diagrams may represent a module, a program segment, or a part of codes, and the module, the program segment, or the part of codes includes one or more executable instructions for implementing specified logic functions. It should also be noted that, in some alternative implementations, functions marked in the blocks may also occur in an order different from the order designated in the accompanying drawings. For example, two consecutive blocks can actually be executed substantially in parallel, and they may sometimes be executed in a reverse order, which depends on involved functions. It should also be noted that each block in the block diagrams and/or flowcharts and combinations of the blocks in the block diagrams and/or flowcharts may be implemented by a dedicated hardware-based system for executing specified functions or operations, or may be implemented by a combination of a dedicated hardware and computer instructions.

The units described and involved in the embodiments of the present disclosure may be implemented by software, or may be implemented by hardware. In some cases, the name of a unit does not constitute a limitation on the unit itself, for example, the first obtaining unit may also be described as "a unit for obtaining at least two Internet Protocol addresses".

The functions described above in the present disclosure may be executed at least in part by one or more hardware logic components. For example, without limitations, exemplary types of the hardware logic components that can be used include: a field programmable gate array (FPGA), an application specific integrated circuit (ASIC), an application specific standard product (ASSP), a system on chip (SOC), a complex programmable logic device (CPLD), and the like.

In the context of the present disclosure, a machine readable medium may be a tangible medium that may include or store a program for use by or in combination with an instruction execution system, apparatus, or device. The machine readable medium may be a machine readable signal medium or a machine readable storage medium. The machine readable medium may include but not be limited to an electronic, magnetic, optical, electromagnetic, infrared, or semi-conductive system, apparatus, or device, or any appropriate combination of them. More specific examples of the machine readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any appropriate combination of them.

According to one or more embodiments of the present disclosure, [Example One] provides an image display method, and the method includes:

determining a current movement increment of a target reference point relative to a current to-be-processed video frame, the current movement increment being determined based on position information of the target reference point in a previous to-be-processed video frame;

determining a current cumulative increment of the target reference point based on the current movement increment and a to-be-called cumulative increment, the to-be-called cumulative increment being determined based on historical movement increments of historical to-be-processed video frames and corresponding historical target movement amounts;

determining a target movement amount of the target reference point according to the current cumulative increment and a preset displacement function; and rendering a target object to a target display position in the current to-be-processed video frame based on the target movement amount.

According to one or more embodiments of the present disclosure, [Example Two] provides an image display method, and the method further comprises:

updating the to-be-called cumulative increment based on the target movement amount and storing the to-be-called cumulative increment into an increment cache pool to determine a target movement amount for a next to-be-processed video frame.

According to one or more embodiments of the present disclosure, [Example Three] provides an image display method, before the determining a current movement increment of a target reference point relative to a current to-be-processed video frame, the method further comprises:

determining a relative position matrix of the target reference point and a rendering camera, to determine, according to the relative position matrix, the current movement increment of the target reference point relative to the current to-be-processed video frame.

The target reference point is used for mounting a target effect.

According to one or more embodiments of the present disclosure, [Example Four] provides an image display method, and the determining a current movement increment of a target reference point relative to a current to-be-processed video frame comprises:

determining camera position information of the rendering camera based on a simultaneous localization and mapping algorithm;

determining current position information of the target reference point according to the relative position matrix and the camera position information; and determining the current movement increment according to the current position information and historical position information corresponding to the previous to-be-processed video frame.

According to one or more embodiments of the present disclosure, [Example five] provides an image display method, and the determining the current movement increment according to the current position information and historical position information corresponding to the previous to-be-processed video frame comprises:

determining a movement sub-increment in a coordinate axis direction according to a current space coordinate corresponding to the current position information and a historical space coordinate corresponding to the historical position information; and taking the movement sub-increment as the current movement increment.

According to one or more embodiments of the present disclosure, [Example Six] provides an image display method, and the determining a current cumulative increment of the target reference point based on the current movement increment and a to-be-called cumulative increment comprises:

retrieving the to-be-called cumulative increment from the increment cache pool, the to-be-called cumulative increment comprising a to-be-called cumulative sub-increment in a coordinate axis direction;

determining a cumulative movement sub-increment of the target reference point in a coordinate axis direction based on the to-be-called cumulative sub-increment and a corresponding movement sub-increment; and taking the cumulative movement sub-increment as the current cumulative increment.

According to one or more embodiments of the present disclosure, [Example Seven] provides an image display method, and the determining a target movement amount of the target reference point according to the current cumulative increment and a preset displacement function comprises:

processing a cumulative movement sub-increment greater than a preset movement amount threshold based on the preset displacement function to obtain a first to-be-moved amount;

taking a cumulative sub-increment not greater than the preset movement amount threshold as a second to-be-moved amount; and determining the target movement amount based on the first to-be-moved amount and the second to-be-moved amount.

According to one or more embodiments of the present disclosure, [Example eight] provides an image display method, the preset displacement function is determined based on a traction coefficient for towing the target object, a preset wind resistance coefficient, and a speed coefficient.

According to one or more embodiments of the present disclosure, [Example Nine] provides an image display method, the rendering a target object to a target display position in the current to-be-processed video frame based on the target movement amount comprises:

based on the target movement amount, determining the target display position of the target reference point in the current to-be-processed video frame; and rendering the target object to the target display position.

According to one or more embodiments of the present disclosure, [Example Ten] provides an image display apparatus, and the apparatus include:

a current movement increment determination module, configured to determine a current movement increment of a target reference point relative to a current to-be-processed video frame, the current movement increment being determined based on position information of the target reference point in a previous to-be-processed video frame;

a current cumulative increment determination module, configured to determine a current cumulative increment of the target reference point based on the current movement increment and a to-be-called cumulative increment, the to-be-called cumulative increment being determined based on historical movement increments of historical to-be-processed video frames and corresponding historical target movement amounts;

a target movement amount determination module, configured to determine a target movement amount of the target reference point according to the current cumulative increment and a preset displacement function; and a rendering module, configured to render a target object to a target display position in the current to-be-processed video frame based on the target movement amount.

In addition, although a plurality of operations have been described in a particular order, it shall not be construed as requiring that such operations are performed in the stated particular order or in a sequential order. Under certain circumstances, multitasking and parallel processing may be advantageous. Similarly, although some specific implementation details are included in the above discussions, these shall not be construed as limitations to the scope of the present disclosure. Some features described in the context of a separate embodiment may also be implemented in combination in a single embodiment. Conversely, various features described in the context of a single embodiment may also be implemented in various embodiments individually or in a plurality of embodiments in any appropriate sub-combination.

What is claimed is:

1. An image display method, comprising:

determining a current movement increment of a target reference point relative to a current to-be-processed video frame, wherein the current movement increment is determined based on position information of the target reference point in a previous to-be-processed video frame;

determining a current cumulative increment of the target reference point based on the current movement increment and a to-be-called cumulative increment, wherein the to-be-called cumulative increment is determined based on historical movement increments of historical to-be-processed video frames and corresponding historical target movement amounts;

determining a target movement amount of the target reference point according to the current cumulative increment and a preset displacement function; and rendering a target object to a target display position in the current to-be-processed video frame based on the target movement amount, wherein before the determining a current movement increment of a target reference point relative to a current to-be-processed video frame, the method further comprises:

determining a relative position matrix of the target reference point and a rendering camera, to determine, according to the relative position matrix, the current movement increment of the target reference point relative to the current to-be-processed video frame;

wherein the target reference point is for mounting a target effect.

2. The method according to claim 1, further comprising:

updating the to-be-called cumulative increment based on the target movement amount and storing the to-be-called cumulative increment that is updated into an increment cache pool to determine a target movement amount for a next to-be-processed video frame.

3. The method according to claim 2, wherein the determining a current cumulative increment of the target reference point based on the current movement increment and a to-be-called cumulative increment comprises:

retrieving the to-be-called cumulative increment from the increment cache pool, wherein the to-be-called cumulative increment comprises a to-be-called cumulative sub-increment in a coordinate axis direction;

determining a cumulative movement sub-increment of the target reference point in the coordinate axis direction based on the to-be-called cumulative sub-increment and a corresponding movement sub-increment; and taking the cumulative movement sub-increment as the current cumulative increment.

4. The method according to claim 1, wherein the determining a current movement increment of a target reference point relative to a current to-be-processed video frame comprises:

determining camera position information of the rendering camera based on a simultaneous localization and mapping algorithm;

determining current position information of the target reference point according to the relative position matrix and the camera position information; and determining the current movement increment according to the current position information and historical position information corresponding to the previous to-be-processed video frame.

5. The method according to claim 4, wherein the determining the current movement increment according to the current position information and historical position information corresponding to the previous to-be-processed video frame comprises:

determining a movement sub-increment in a coordinate axis direction according to a current space coordinate corresponding to the current position information and a historical space coordinate corresponding to the historical position information; and taking the movement sub-increment as the current movement increment.

6. The method according to claim 1, wherein the determining a target movement amount of the target reference point according to the current cumulative increment and a preset displacement function comprises:

in response to a cumulative movement sub-increment being greater than a preset movement amount threshold, processing the cumulative movement sub-increment based on the preset displacement function to obtain a first to-be-moved amount;

in response to the cumulative movement sub-increment being not greater than the preset movement amount threshold, taking the cumulative movement sub-increment as a second to-be-moved amount; and determining the target movement amount based on the first to-be-moved amount and the second to-be-moved amount.

7. The method according to claim 1, wherein the preset displacement function is determined based on a traction coefficient for towing the target object, a preset wind resistance coefficient, and a speed coefficient.

8. The method according to claim 1, wherein the rendering a target object to a target display position in the current to-be-processed video frame based on the target movement amount comprises:

based on the target movement amount, determining the target display position of the target reference point in the current to-be-processed video frame; and rendering the target object to the target display position.

9. A non-transitory computer-readable storage medium, comprising computer-executable instructions, wherein the computer-executable instructions, when executed by a computer processor, are used for performing an image display method, wherein the method comprises:

determining a current movement increment of a target reference point relative to a current to-be-processed video frame, wherein the current movement increment is determined based on position information of the target reference point in a previous to-be-processed video frame;

determining a current cumulative increment of the target reference point based on the current movement increment and a to-be-called cumulative increment, wherein the to-be-called cumulative increment is determined based on historical movement increments of historical to-be-processed video frames and corresponding historical target movement amounts;

determining a target movement amount of the target reference point according to the current cumulative increment and a preset displacement function; and rendering a target object to a target display position in the current to-be-processed video frame based on the target movement amount, wherein before the determining a current movement increment of a target reference point relative to a current to-be-processed video frame, the method further comprises:

determining a relative position matrix of the target reference point and a rendering camera, to determine, according to the relative position matrix, the current movement increment of the target reference point relative to the current to-be-processed video frame;

wherein the target reference point is for mounting a target effect.

10. The non-transitory computer-readable storage medium according to claim 9, wherein the computer-executable instructions, when executed by the computer processor, cause the computer processor to further perform:

updating the to-be-called cumulative increment based on the target movement amount and storing the to-be-called cumulative increment that is updated into an increment cache pool to determine a target movement amount for a next to-be-processed video frame.

11. An electronic device, comprising:

one or more processors;

a storage, configured to store one or more programs, wherein the one or more programs, when executed by the one or more processors, cause the one or more processors to implement an image display method, wherein the method comprises:

determining a current movement increment of a target reference point relative to a current to-be-processed video frame, wherein the current movement increment is determined based on position information of the target reference point in a previous to-be-processed video frame;

determining a current cumulative increment of the target reference point based on the current movement increment and a to-be-called cumulative increment, wherein the to-be-called cumulative increment is determined based on historical movement increments of historical to-be-processed video frames and corresponding historical target movement amounts;

determining a target movement amount of the target reference point according to the current cumulative increment and a preset displacement function; and rendering a target object to a target display position in the current to-be-processed video frame based on the target movement amount, wherein before the step of determining a current movement increment of a target reference point relative to a current to-be-processed video frame, the one or more programs, when executed by the one or more processors, cause the one or more processors to further perform:

determining a relative position matrix of the target reference point and a rendering camera, to determine, according to the relative position matrix, the current movement increment of the target reference point relative to the current to-be-processed video frame;

wherein the target reference point is for mounting a target effect.

12. The electronic device according to claim 11, wherein the one or more programs, when executed by the one or more processors, cause the one or more processors to further perform:

updating the to-be-called cumulative increment based on the target movement amount and storing the to-be-called cumulative increment that is updated into an increment cache pool to determine a target movement amount for a next to-be-processed video frame.

13. The electronic device according to claim 12, wherein when performing the step of determining a current cumulative increment of the target reference point based on the current movement increment and a to-be-called cumulative increment, the one or more processors is caused to perform:

retrieving the to-be-called cumulative increment from the increment cache pool, wherein the to-be-called cumulative increment comprises a to-be-called cumulative sub-increment in a coordinate axis direction;

determining a cumulative movement sub-increment of the target reference point in the coordinate axis direction based on the to-be-called cumulative sub-increment and a corresponding movement sub-increment; and taking the cumulative movement sub-increment as the current cumulative increment.

14. The electronic device according to claim 11, wherein when performing the step of determining a current movement increment of a target reference point relative to a current to-be-processed video frame, the one or more processors is caused to perform:

determining camera position information of the rendering camera based on a simultaneous localization and mapping algorithm;

determining current position information of the target reference point according to the relative position matrix and the camera position information; and determining the current movement increment according to the current position information and historical position information corresponding to the previous to-be-processed video frame.

15. The electronic device according to claim 14, wherein when performing the step of determining the current movement increment according to the current position information and historical position information corresponding to the previous to-be-processed video frame, the one or more processors is caused to perform:

determining a movement sub-increment in a coordinate axis direction according to a current space coordinate corresponding to the current position information and a historical space coordinate corresponding to the historical position information; and taking the movement sub-increment as the current movement increment.

16. The electronic device according to claim 11, wherein when performing the step of determining a target movement amount of the target reference point according to the current cumulative increment and a preset displacement function, the one or more processors is caused to perform:

in response to a cumulative movement sub-increment being greater than a preset movement amount threshold, processing the cumulative movement sub-increment based on the preset displacement function to obtain a first to-be-moved amount;

in response to the cumulative movement sub-increment being not greater than the preset movement amount threshold, taking the cumulative movement sub-increment as a second to-be-moved amount; and determining the target movement amount based on the first to-be-moved amount and the second to-be-moved amount.

17. The electronic device according to claim 11, wherein the preset displacement function is determined based on a traction coefficient for towing the target object, a preset wind resistance coefficient, and a speed coefficient.

18. The electronic device according to claim 11, when performing the step of rendering a target object to a target display position in the current to-be-processed video frame based on the target movement amount, the one or more processors is caused to perform:

based on the target movement amount, determining the target display position of the target reference point in the current to-be-processed video frame; and rendering the target object to the target display position.

* * * * *